United States Patent [19]

Djupsjöbacka

[11] Patent Number: 4,797,641
[45] Date of Patent: Jan. 10, 1989

[54] OPTOELECTRONIC MODULATOR

[75] Inventor: Anders G. Djupsjöbacka, Solna, Sweden

[73] Assignee: Telefonaktiebolaget Lm Ericsson, Stockholm, Sweden

[21] Appl. No.: 840,910

[22] Filed: Mar. 18, 1986

[30] Foreign Application Priority Data

Apr. 30, 1985 [SE] Sweden .................... 8502113

[51] Int. Cl.$^4$ .............................................. G02F 1/03
[52] U.S. Cl. .................... 332/7.51; 350/96.14
[58] Field of Search .............. 332/7.51; 350/96.14, 350/96.11–96.13

[56] References Cited

U.S. PATENT DOCUMENTS

| | | | |
|---|---|---|---|
| 4,070,094 | 1/1978 | Martin | 350/96.14 |
| 4,198,116 | 4/1980 | Papuchon | 350/96.14 |
| 4,251,130 | 2/1981 | Marcatili | 350/96.14 |
| 4,266,850 | 5/1981 | Burns | 350/96.14 |
| 4,288,785 | 9/1981 | Papuchon et al. | 350/96.14 X |
| 4,340,272 | 7/1982 | Papuchon et al. | 350/96.14 |
| 4,381,139 | 4/1983 | Alferness | 350/96.14 |
| 4,448,479 | 5/1984 | Alferness | 350/96.14 |

FOREIGN PATENT DOCUMENTS

| | | |
|---|---|---|
| 0025386 | 8/1981 | France . |
| 0125182 | 11/1984 | France . |
| 2007384 | 5/1979 | United Kingdom . |
| 2095419 | 9/1982 | United Kingdom . |
| 2138587 | 10/1984 | United Kingdom . |
| 2148023 | 5/1985 | United Kingdom . |

OTHER PUBLICATIONS

"Band Pass Response Travelling Wave Modulator With Transit Time Difference Compensation", IEE, London, England, VIII+194 pp., p. 3, 1983.

Primary Examiner—Thomas H. Tarcza
Assistant Examiner—Mark Hellner
Attorney, Agent, or Firm—Roberts, Spiecens & Cohen

[57] ABSTRACT

An optoelectronic modulator for generating an optical signal in which a wafer (10) of optoelectronic material has two parallel light wave conductors (13a,13b) and three planar electrodes (14a,14b,14c). The latter are arranged so that two electrodes adjacent each other define by their long sides an elongate intermediate space with at most three sections, which are transversely displaced in relation to each other. One long side of one of the sections is situated approximately in the line of extension of the other long side in an adjacent section and the lightwave conductors (13a,13b) are situated in the extension lines. The lightwave conductors are modulated in counter-phase in two adjacently situated sections by a modulating alternating voltage (U) which is connected to the electrodes. The ratio between the length ($L_1$) of the longest section and the length (L) of the electrodes is in the range of 0.70 to 0.95. By the electrode configuration, the modulator is given high upper boundary frequency and good pulse response.

8 Claims, 5 Drawing Sheets

OPTOELECTRONIC MODULATOR

FIELD OF THE INVENTION

The invention relates to an optoelectronic modulator for generating an optical signal, the modulator including three planar electrodes and two lightwave conductors, the difference modulation of which is sensed at the output.

BACKGROUND

In modulators of the kind given above, comprising a wafer of optoelectronic material with lightwave conductors, it is known to form the electrodes as three rectangular plates, extending along the lightwave conductors. The electrodes are connected to an electric microwave source which genrates an electric field through the conductors, causing their refractive index to be changed. This also changes the length of the optical path in the lightwave conductors and this is used to modulate the lightwave obtained when the lightwaves in the two lightwave conductors are superimposed. The lightwave has a greater velocity than the microwave which limits the modulators' frequency range, which is the so-called "walk-off effect". The upper boundary frequency can be raised by making the electrodes shorter, although this requires a higher microwave voltage which is difficult to generate. In U.S. Pat. No. 4,448,479 there is shown a modulator with relatively complicated electrodes, which has a higher upper boundary frequency for a moderate modulation voltage. This modulator has the disadvantage, apart from the complicated electrodes, that its modulating ability is poor for individual electric pulses, i.e. its pulse response is poor. This has great disadvantages in information transmission, for example, in which binary numbers are transferred by discrete pulses. The modulator in the patent also has limited modulating ability for low frequencies of the modulating microwave.

SUMMARY OF THE INVENTION

The above-mentioned disadvantages are overcome in accordance with the invention by the provision of an optoelectronic modulator with simply formed electrodes, which has good modulating ability at low frequencies, a high upper boundary frequency and good pulse response. The distinguishing features of the invention will be apparent from the accompanying claims.

BRIEF DESCRIPTION OF DRAWINGS

The invention will now be described in detail in connection with the drawing in which.

DETAILED DESCRIPTION OF A BEST MODE FOR CARRYING OUT THE INVENTION

Figure 1:
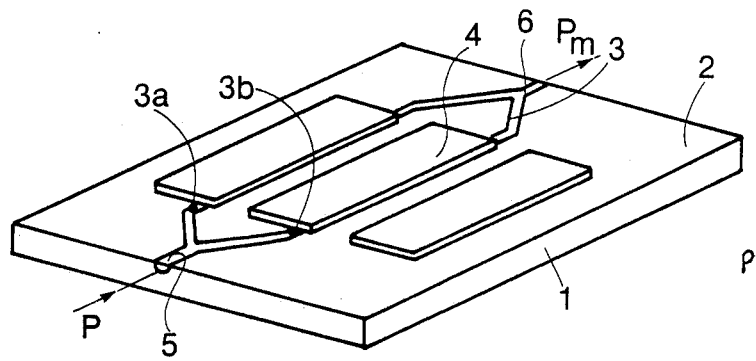
FIG. 1 is a perspective from above of an optoelectronic Mach-Zehnder modulator with conventionally formed electrodes.
Figure 2:
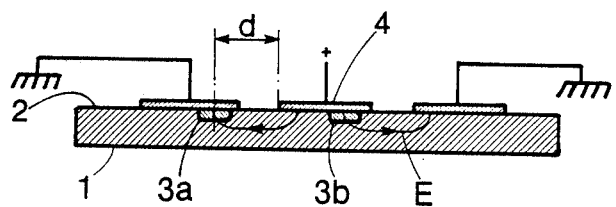
FIG. 2 is a cross section of the optoelectronic modulator in FIG. 1.

In FIG. 1 there is shown in perspective a known optoelectronic Mach-Zehnder modulator. A wafer 1 of optoelectronic material, e.g. lithium niobate, has lightwave conductors 3 at its upper surface 2. These conductors have a higher refractive index than the wafer, and can be produced by a method such as diffusing titanium to a given depth in the wafer 1. From a common input 5 the lightwaves fork out to two parallel wave conductors 3a and 3b, which then converge to a common output 6. There are three metal electrodes 4 extending along the wave conductors 3a and 3b on the upper surface of the wafer. An electric field E may be generated in the wafer with the aid of the electrodes, as is illustrated in FIG. 2. When this field passes through the two parallel wave conductors 3a and 3b, there is a small change in the refractive index n of the conductors, which is substantially proportional to the electric field strength. In the electric field depiction shown, the change in the refractive index n has opposite signs in the wave conductors 3a and 3b. The difference in length of the optical path which thus occurs between the wave conductors is utilized to modulate a lightwave P having constant amplitude and wave length, which is connected to the modulator input 5. The lightwave P is divided up, and in the wave conductors 3a and 3b there is a mutual phase shift in response to the difference in length of optical path, before these wave portions are superimposed at the output 6 to form a light signal $P_m$. Since the lightwaves in the wave conductors have the same amplitude and by a suitable selection of electrode voltage, the lightwaves may be phase-shifted half a light wavelength so that the light is completely extinguished on superimposition.

Figure 3:
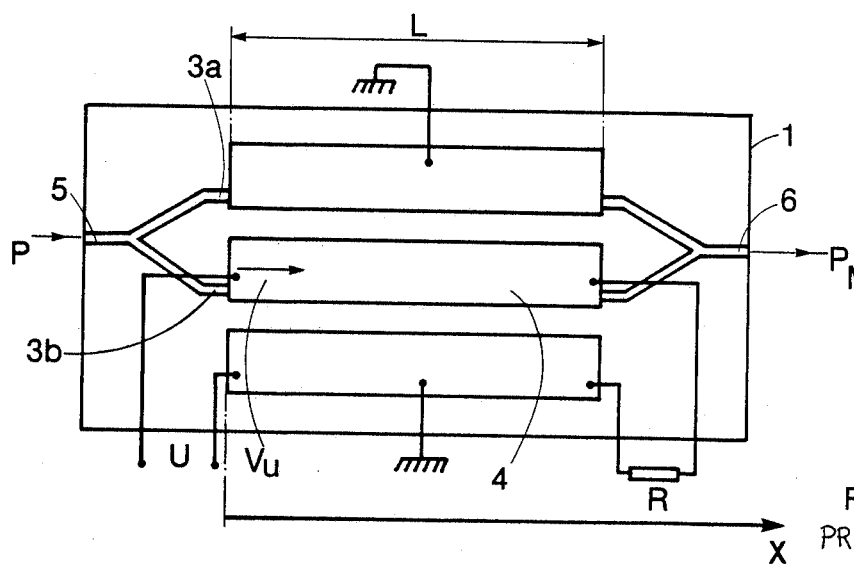
FIG. 3 illustrates the conventional modulator in plan with the electrodes coupled as migrating wave electrodes and connected to a modulating voltage U.
Figure 4A:
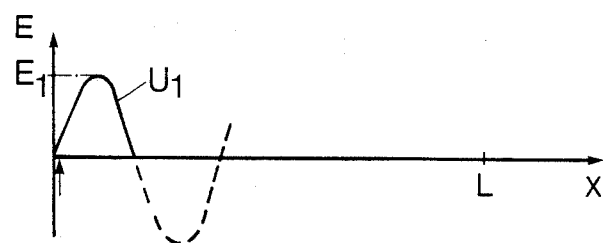
FIGS. 4a-c are graphical diagrams illustrating the velocity comparison between a lightwave and a moudlating microwave.
Figure 4B:
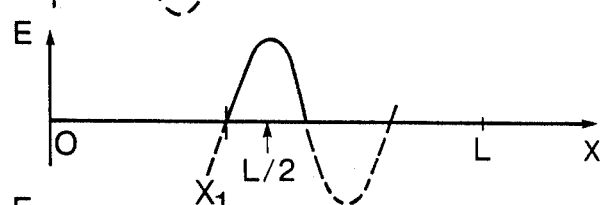
Figure 4C:
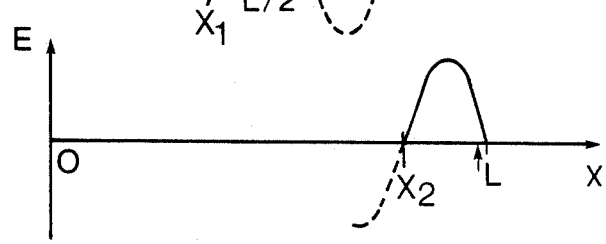
Figure 5A:
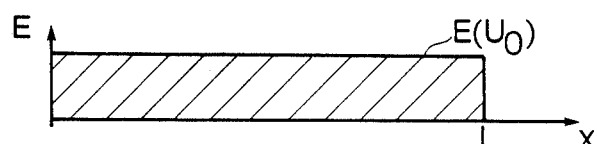
FIGS. 5a-d are graphical diagrams showing the modulating ability of the conventional modulator at different modulation frequencies of the Voltage U.
Figure 5B:
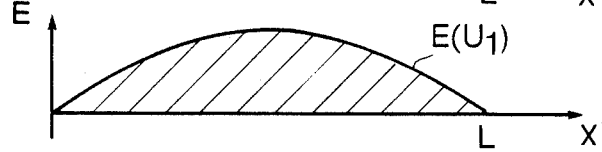
Figure 5C:
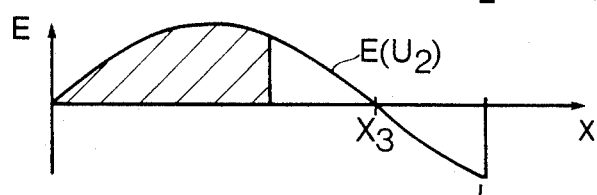
Figure 5D:
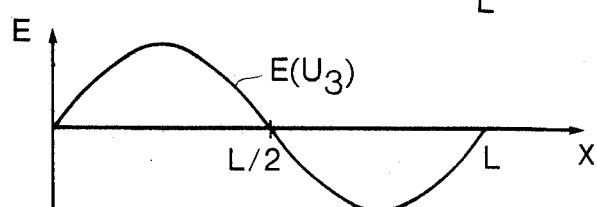

The modulator according to FIG. 1 is connected as a high frequency modulator in FIG. 3. The electrodes 4, so-called migrating wave electrodes, are now regarded as transmission conductors of a length L and are terminated without reflection via a resistor R. A high-frequency signal U is applied to the electrodes and is propagated along the electrodes with a velocity $$V_u = \frac{C_o}{\sqrt{\epsilon_r}}$$

where $C_o$ is the speed of light and $\epsilon$ is the effective dielectric constant for the electrodes 4. The lightwaves in the conductors 3a and 3b are propagated with a velocity $$C = \frac{C_o}{n}$$

where the $V_u < C$. This gives rise to the so-called walk-off effect, which will be explained with the aid of an example and in connection with FIGS. 4a–4c. In these figures, E denotes the electric field achieved by a signal $U_1$ with a frequency $f_1$, and X denotes the position along the electrode 4. In FIG. 4a the electric field E is shown at a given instant when a photon in the lightwave conductor 3b has just arrived at the electrode 4. The position of the photon is indicated in the Figure by an arrow and the electric field in the vicinity of the photon has been indicated by a solid line. The electric field strength through the lightwave conductor 3b at the photon is in this situation $E=0$. In FIG. 4b the photon has arrived at the position $X=L/2$ with the velocity C, while the signal $U_1$ with the velocity $V_u$ has only reached a position $X=X_1$. In the example, the frequency $f_1$ is selected such that in this position the photon is acted on by the electrical field maximum value $E_1$. In FIG. 4c the signal $U_1$ has arrived at a position $X=X_2$, while the photon has arrived at the end of the electrode $X=L$ so that modulation ceases, or changes sign, which is usually termed "walk-off". The signal $U_1$ has been shifted half a wavelength after the photon and the electric field at the photon is $E=0$. In the example above, the electric field strength which acts on the lightwave conductor 3b at the photon during its movement through the wave conductor is illustrated in FIG. 5b. Here E denotes the electric field strength, X denotes the position along the electrode 4 and L denotes the length of the electrode. The total phase shift of the lightwave corresponds, according to the description pertaining to FIG. 2, to the hatched area under the curve in the Figure. This area corresponds to the phase shift of the lightwave that the signal $U_1$ is capable of achieving. The signal $U_1$ must have a given maximum value for the two interfering lightwaves at the modulator output 6 to be phase-shifted half a wavelength so that they completely extinguish each other. In FIG. 5a there is shown the electric field in the lightwave conductors when the signal U is a direct voltage $U_o$. In FIG. 5c there is shown the electric field which acts on a photon in the lightwave conductors when the electrodes are connected to a signal $U_2$, the frequency of which has been selected such that $f_2 \approx 1.3 \times f_1$. The lightwaves in the wave conductors 3a and 3b are mutually phase-shifted at the frequency $f_2$ forwards to a position $X_3$ in the manner described in conjunction with FIG. 5b. Walk-off occurs at the position $X_3$ and the phase shift between the lightwaves decreases during the continued movement of the light from the position $X_3$ to the end of the electrode $X=L$. A resulting phase shift is illustrated by the hatched area, which is the difference between the areas above and below the X-axis. For the resulting phase shift to be sufficient for a modulation of the lightwave P the signal $U_2$ must have a maximum value at the frequency $f_2$ which substantially exceeds the maximum value of the signal $U_1$. This is a great disadvantage with the conventional high-frequency modulator described above, since it is difficult to generate high-frequency signals with a large maximum value. In FIG. 5d there is illustrated an electric field which acts on a photon in the lightwave conductors when the electrodes are connected to a signal $U_3$ of a frequency $F_3 = 2 \times f_1$. Walk-off occurs at the frequency $f_3$ at a position $X=L/2$ and the resulting area is zero. There is no modulation of the lightwave P, and the frequency $f_3$ is the upper boundary frequency of this known high frequency modulator.

Figure 6:
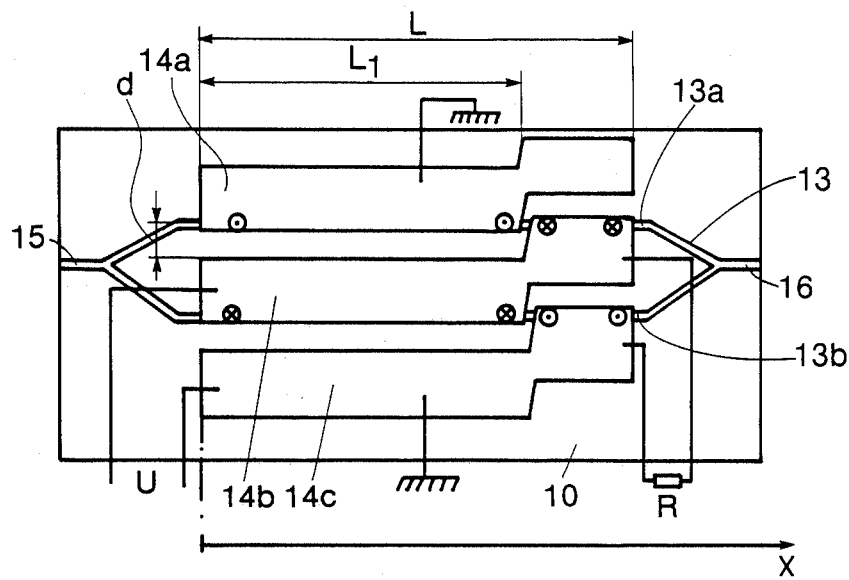
FIG. 6 is a plan view seen from above of the inventive modulator with the electrodes coupled as migration wave electrodes and connected to the modulating voltage U.
Figure 7A:
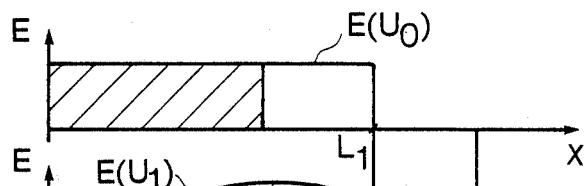
FIGS. 7a-d are graphical diagrams illustrating the modulating ability of the inventive modulator at different modulation frequencies of the Voltage U.
Figure 7B:

An embodiment of a high-frequency modulator in accordance with the invention is illustrated in FIG. 6. A wafer 10 of optoelectronic material, e.g. lithium niobate has a lightwave conductor 13 diffused into it to a given depth in the wafer, as with the conventional modulator. The inventive modulator has an input 15 from which the wave conductor is forked into two parallel wave conductors 13a and 13b, which then converge to an output 16. For generating the electric field E in the wave conductors, the modulator has three electrodes 14a, 14b and 14c, these being migration wave electrodes of the type mentioned above, and are divided into two sections. In the Figure, X denotes the position along the electrodes and D denotes a distance between one of the lightwave conductors 13a or 13b and the nearest long side of the adjacent electrode. In the first section of length $L_1$, nearest the input 15, the lightwave conductor 13a lies under the electrode 14a in the way illustrated in cross section in FIG. 2, and at a distance d from the adjacent electrode 14b. The lightwave conductor 13b lies under the electrode 14b at a distance d from the electrode 14c. At the position $X=L_1$, where $$L_1 > \frac{L}{2},$$

the electrodes are shifted transversely so that the conductor 13a is under the electrode 14b and at a distance d from the electrode 14a. The conductor 13b is under the electrode 14c and at a distance d from the electrode 14b. As a result of this transverse displacement of the electrodes, if the electrodes are connected to the direct voltage $U_o$, the direction of the electric field E through the conductors will be reversed at the position $X=L_1$, as is denoted in the Figure by the symbols ⊗ and ⊙. The transverse displacement of the electrodes causes the effect of walk-off to be counteracted, and the upper boundary may be raised, as will be explained in conjunction with FIG. 7d while comparing with FIG. 5d. In FIGS. 7a–d, X denotes the position along the electrodes and E denotes the electrical field strength through the wave conductors 13a and 13b, which acts on a photon moving through the conductors. The electrodes 14b and 14c are connected to the previously mentioned high-frequency signal $U_3$ of the frequency $f_3$. As mentioned in conjunction with FIG. 5d, walk-off occurs at this frequency at the position $X=L/2$. In the known modulator, with the electrode structure described in FIG. 4, the phase shift decreases during the entire movement of the light from $X=L/2$ up to the end of the electrode. $X=L$, so the modulation effect entirely ceases. In the inventive electrode structure, the sign of the electrode field E is reversed at the position $X=L_1$, where the electrodes are transversely displaced. This causes the phase shift between the lightwaves in the wave conductors 13a and 13b to increase once again at the movement of the light from the position $X=L_1$ to the end of the electrodes, $X=L$. At the selected frequency $f_3$, the total phase shift between the lightwaves corresponds in this way to the hatched area in FIG. 7d. The FIGS. 7a and 7b show how the transverse displacement of the long sides of the electrodes acts on the phase shift at the modulating signal $U_0$, which is a direct voltage, and at $U_1$ with the frequency $f_1$. The total phase shift at a given maximum value of the signal U, corresponding to the hatched areas, is less for the inventive modulator than for the known modulator at these frequencies. For higher frequencies, e.g. the frequencies $f_2$ and $f_3$ according to FIGS. 7c and 7d, the inventive modulator has greater phase shift than the conventional modulator. The comparison made above of the modulators can be expressed by a quality factor G which is the ratio of the modulator band-width and the required voltage of the signal U. Some modulators are compared in this way in the table below. The long section of the electrodes is denoted by $L_1$, where they have the total length L, and D denotes a relative measure of the phase displacement when the signal U is a direct voltage.

| $L_1/L$ | D | G |
|---------|------|------|
| 1.00 | 0.24 | 14.2 |
| 0.90 | 0.20 | 15.6 |
| 0.80 | 0.15 | 18.9 |
| 0.75 | 0.13 | 21.1 |
| 0.70 | 0.10 | 18.4 |
| 0.60 | 0.05 | 18.2 |

Figure 8:
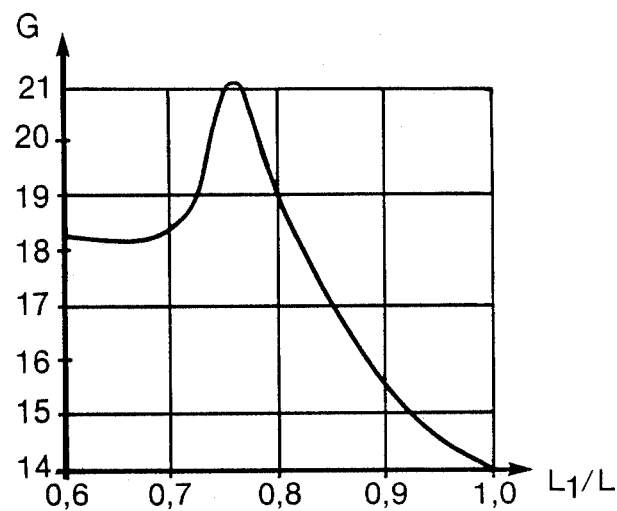
FIG. 8 is a graphical diagram for comparing the conventional and the inventive modulator.

A graphical diagram is shown in FIG. 8 with the quality factor G from the table as a function of the ratio $L_1/L$. It will be seen from the diagram that for the inventive modulator with $L_1/L=0.77$, the quality factor G is about 50% greater than for the known modulator with $L_1/L=1$. According to the table the phase shift at direct voltage for the modulator with $L_1/L=0.77$ is less than for a known modulator, which from the practical aspect is partially balanced by it being easier to generate a large direct voltage than a high-frequency alternating voltage with a large top value. The value of $L_1/L<0.7$ is not of interest, since the quality factor G is nearly constant for lower values, and the factor D expressing low frequency properties is very small.

According to FIG. 6 the inventive modulator described above has electrodes in which the second section closest to the modulator output has been displaced transversely, a distance which is less than $L/2$. This transverse displacement of the electrode long sides can also be carried out for the parts thereof closest to the modulator input 15 in accordance with the invention, so that the second section has the length $$L_1 > \frac{L}{2}.$$

Figure 7C:
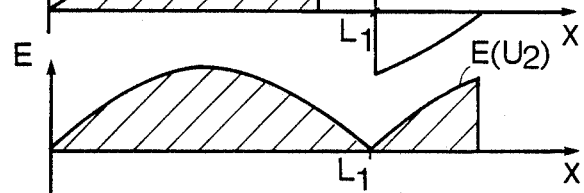
Figure 7D:
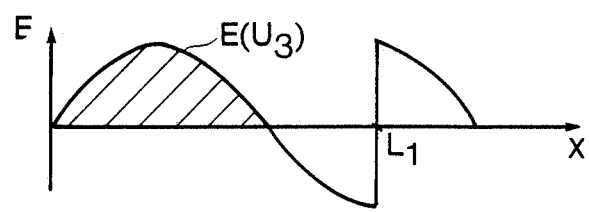
Figure 9:
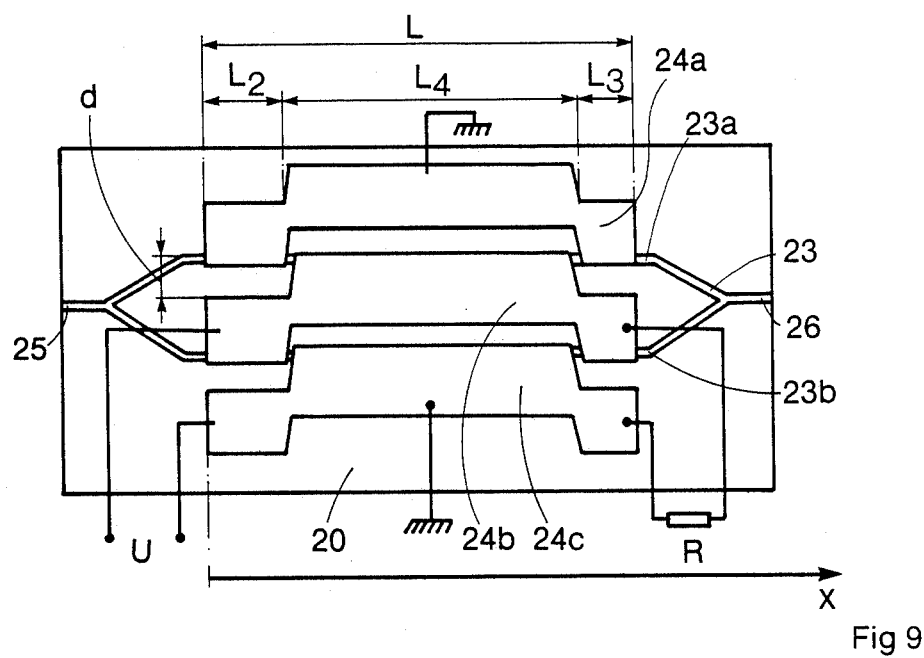
FIG. 9 is a plan view seen from above of a further embodiment of the inventive modulator.

With the aid of reasoning corresponding to that established above in conjunction with FIG. 7c, it may be shown that such a modulator is given the same phase-shifting properties as the modulator in the selected embodiment. A further embodiment of a modulator in accordance with the invention is illustrated in FIG. 9. This modulator includes a wafer 20 of optoelectronic material on which light conductors 23 have been difused to a given depth therein. The wave conductors have an input 25 and are forked into two parallel conductors 23a and 23b which then converge to an output 26. There are three electrodes 24a, 24b and 24c of the length L on the surface of the modulator, these also being the migrating wave type of electrode, and they are divided into three sections. In the Figure, X denotes the position along the electrodes and d denotes the distance between one of the conductors 23a or 23b and one long side of an adjacent electrode. In the first section with a length $L_2$ the conductor 23a lies under the electrode 24a in the manner illustrated in FIG. 2, and at a distance d from the adjacent electrode 24b. The conductor 23b lies under the electrode 24b and at a distance d from the adjacent electrode 24c. At the position $X=L_2$, the electrodes are transversely displaced so that the conductor 23a in the second section with the length $L_1$ is under the electrode 24b and at a distance d from the electrode 24a. The conductor 23b is under the electrode 24c and at a distance d from the electrode 24b. At the position $X=L_1+L_2$, the electrodes are again transversely displaced so that the electrodes in the third section with a length $L_3$ have the same transverse position in relation to the lightwave conductors 23a and 23b as in the first section. With the aid of reasoning corresponding to that performed above in conjunction with FIG. 7d, it can be shown that the inventive modulator described in conjunction with FIG. 9 is given substantially the same phase-shifting properties as the modulator in the selected embodiment according to FIG. 6.

Figure 10A:
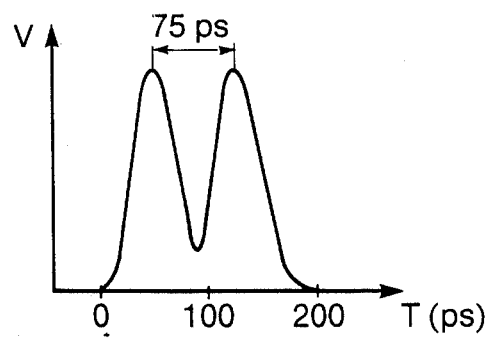
FIG. 10a is a graphical diagram illustrating two adjacent electric pulses.
Figure 10B:
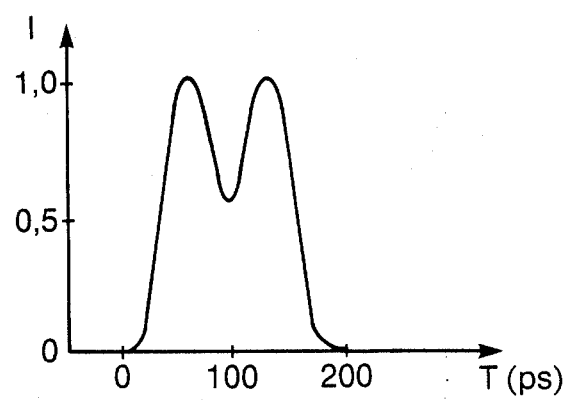
FIG. 10b is a graphical diagram of the pulse response from the conventional modulator to these pulses and FIG. 10c is a graphical diagram of the pulse response from the inventive modulator to these pulses.
Figure 10C:
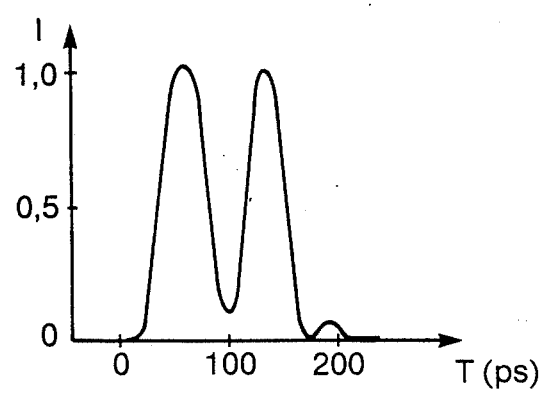

In many high-frequency modulators, e.g. information transmission it is essential that the modulator have good pulse response. By this is intended that the modulator give a sharply defined light pulse if a sharply defined electric pulse is applied to the modulator electrodes. As previously mentioned, there are modulators which have high upper boundary frequency for a continuous high-frequency electric input signal, but which have very poor pulse response for individual electric pulses on the electrodes. The inventive modulator has, apart from high upper boundary frequency, also good pulse response, as is illustrated by the example in FIG. 10. In this Figure the pulse reply for the known modulator according to FIG. 3 is compared with the inventive modulator with $L_1/L=0.75$. A double pulse is connected to the modulator electrodes, the appearance of this pulse being shown in FIG. 10a, where V denotes the pulse voltage, T the time in piko seconds (ps) where 1 ps $= 10^{-12}$. The distance between the pulse crests is 75 ps and the pulse length for half the crest voltage is 50 ps. The pulse response for the known modulator is illustrated in FIG. 10b, and for the inventive modulator in FIG. 10c. In these Figures, I denotes the light pulse intensity and T denotes the time in ps. The light pulses for the inventive modulator are sharply separated from each other. The light pulses from the known modulator are wide and merged together so that they will be denoted as one pulse by a receiving unit. The good pulse response of the inventive modulator for high pulse frequencies is explained by the first pulse, due to the transverse displacement of the electrodes, giving a negative contribution to the modulation, which counteracts the positive modulation at the beginning of the second pulse. The total modulating effect between the pulses will be small, so that the pulses will be sharply separated from each other, as illustrated in FIG. 10c.

What is claimed is:

1. An optoelectric modulator for generating an optical signal comprising a wafer of optoelectronic material, two spaced lightwave conductors having opposite ends at which they are connected to each other to form input and output ends, means for introducing a lightwave of constant amplitude and wave length at said input end, the lightwave undergoing division in the conductors and mutual phase shift, the conductors being uncoupled between the input and output ends so that the divided lightwaves in the conductors do not influence one another, a difference modulation between the conductors being sensed at the output end, and three planar electrodes extending substantially parallel to one another and respectively including transversely offset portions such that two adjacent electrodes define with their longitudinal sides an elongate intermediate space of up to three sections, which are transversely displaced in relation to each other such that one longitudinal side of one of the sections is situated approximately in the line of extension of the other longitudinal side in the adjacent section, the lightwave conductors being disposed along said extension lines so as to be connected with one portion of one electrode and an adjacent portion of the adjacent electrode, means for applying a modulating voltage between the middle electrode and the two outer electrodes, so that the lightwave conductors are modulated in counter-phase in the two adjacent sections by said modulating voltage, the relationship between the lengths of said sections being such that the ratio of the length of the longest section and the length of the electrodes is in the range of 0.70 to 0.94 whereby the modulator has a frequency response between DC and high frequencies.

2. A modulator as claimed in claim 1 wherein said ratio is about 0.77.

3. A modulator as claimed in claim 1 wherein said sections are two in number.

4. A modulator as claimed in claim 1 wherein said sections are three in number.

5. A modulator as claimed in claim 1 wherein said electrodes include respective portions which are transversely offset by equal amounts to form said displaced sections.

6. A modulator as claimed in claim 5 wherein said sections are three in number and each electrode includes a middle portion and two end portions, the middle portion being transversely offset relative to said end portions.

7. A modulator as claimed in claim 1 wherein each electrode is continuous along its length.

8. A modulator as claimed in claim 1 wherein each lightwave conductor extends along its extension line to connect with a longer portion of one electrode and a shorter portion of the adjacent electrode.

* * * * *